United States Patent [19]

Yoshida et al.

[11] Patent Number: 4,995,932

[45] Date of Patent: Feb. 26, 1991

[54] METHOD FOR PRODUCTION OF PAVING BLOCKS

[75] Inventors: Kinoto Yoshida, Saitama; Morizumi Fujii, Aichi; Tokihiro Tsuda; Shigeo Suda, both of Saitama; Osamu Kodama; Kazuro Kuroe, both of Saitama; Takumi Tanikawa; Michihiko Nishimura, both of Aichi; Hideyuki Munakata, Tokyo, all of Japan

[73] Assignees: Chichibu Cement Co., Ltd., Tokyo; Inax Corporation, Aichi; ILB Co., Ltd., Tokyo, all of Japan

[21] Appl. No.: 360,922

[22] PCT Filed: Jul. 13, 1988

[86] PCT No.: PCT/JP88/00698

§ 371 Date: Mar. 14, 1989

§ 102(e) Date: Mar. 14, 1989

[87] PCT Pub. No.: WO89/00625

PCT Pub. Date: Jan. 26, 1989

[30] Foreign Application Priority Data

| | | | |
|---|---|---|---|
| Jul. 14, 1987 | [JP] | Japan | 62-175450 |
| Jul. 15, 1987 | [JP] | Japan | 62-176623 |
| Jul. 15, 1987 | [JP] | Japan | 62-176624 |

[51] Int. Cl.[5] .................... B29C 29/12

[52] U.S. Cl. .................... 156/242; 156/245; 156/293; 264/69; 264/71; 264/228; 264/256

[58] Field of Search .................... 156/245, 293; 264/69, 264/71, 228, 256, 271.1, 293, DIG. 31, DIG. 43, DIG. 63

[56] References Cited

U.S. PATENT DOCUMENTS

| | | | |
|---|---|---|---|
| 479,365 | 7/1892 | Houghton et al. | 264/256 |
| 531,842 | 1/1895 | Haddock | 264/256 |
| 1,471,990 | 10/1923 | Wert | 264/DIG. 43 |
| 1,629,103 | 5/1927 | Honberger | 264/256 |
| 2,018,192 | 10/1935 | Sexton | 264/71 |
| 2,629,135 | 2/1953 | Johnson | 264/256 |
| 2,700,810 | 2/1955 | Garni | 264/71 |

*Primary Examiner*—Caleb Weston

*Attorney, Agent, or Firm*—Browdy and Neimark

[57] ABSTRACT

The fracture-free paving block (1) comprises a cement block substrate (1-1) and a top solid layer (1-2), and is characterized in that the top layer is selected from a cured cement mortar layer and a tile-like layer firmly bonded to the substrate with cement mortar; the top layer is bonded to the block substrate with lateral margins (2) of 1 to 8 mm wide in horizontal distance ($l_5$) from the peripheral edges of the substrate: and the vertical distance ($l_6$) from the surface of the top layer to the peripheral edge of the substrate is 5 to 50 mm. The method for producing the paving block (1) having a tile-like top layer comprises applying adhesive cement mortar between the back of the top layer (1-2) and the upper surface of the substrate (1-1); placing the top layer on the substrate with the above-mentioned margins (2) of the substrate surface: and applying vibration and/or pressurization between the top layer and the substrate.

16 Claims, 3 Drawing Sheets

[PRIOR ART]

METHOD FOR PRODUCTION OF PAVING BLOCKS

DESCRIPTION

1. Technical Field

This invention relates to a novel paving block to be installed on the grounds such as streets and floors, and to a method for production of the paving blocks.

2. Background Art

The plane configurations of conventional paving blocks have a variety of shapes such as rectangles, squares, triangles, other polygons, circles, ovals, and other shapes. The peripheral side lines of the block can be straight, a curved line, a wave-like line or a combination thereof, as far as the blocks can be joined at an interval of a few millimeters when they are installed. The same plane configurations as those conventional blocks are employed in the present paving blocks.

A perspective view of a conventional paving block of rectangular parallelepiped is illustrated in FIG. 9, wherein a ceramic tile is bonded onto a cement concrete block having the same plane dimensions as the tile. Such conventional tile-bonded blocks have been produced by (1) placing a tile upside-down on the bottom of a casting mold and then casting concrete mortar thereon, or (2) casting concrete mortar into the mold and placing a tile thereon (e.g. Japanese Laid-open Pat. Application No. 61-142202). According to the above-mentioned method (1), some dissolved components of concrete mortar flow down and deposit on the tile surface to form efflorescence. According to the method (2), lots of voids remain or are formed at the interface between the tile and block, which largely deteriorate the bonding strength between them. Moreover, durability is also decreased because water such as rain often permeates into the bonded interface through the voids.

Incidentally, a tile-bonded panel is known for walls composed of a multiplicity of tiles bonded onto a substrate board. In such tile panels, large bonding strength of tile is not especially needed because a large external force is not pressed on such wall panels, and also permeation of water is prevented because joint intervals of the tiles on the substrate board are filled with jointing paste. Thus, such tile-bonded panels for walls should be clearly distinguished from tile-bonded paving blocks.

The paving blocks are installed on the grounds such as streets at an interval of about 2 to 5 mm. The joint intervals of blocks thus installed are filled with sand (not with jointing paste).

The paving blocks installed on the grounds such as streets receive a variety of heavy loads from cars or the like. As a result, the blocks move to each other by complicated forces applied thereto and are often inclined together, whereby the shoulder portions of adjacent blocks collide with each other and break off.

SUMMARY OF THE INVENTION

The main object of the present invention is to solve the above-mentioned breaking or fracture problems and to provide novel paving blocks wherein the fracture of the shoulder portions is substantially eliminated.

There is thus provided, according to the present invention, a paving block having a structure comprising a block substrate consisting essentially of inorganic hydraulic cement and aggregate, and a top solid layer bonded to the upper surface of the block substrate: characterized in that the top layer is selected from a cured cement mortar layer firmly bonded to the substrate by its self-adhesive property and a tile-like layer firmly bonded to the substrate with cured cement mortar; the top layer is bonded to the block substrate with lateral margins of the substrate around the top layer of about 1 to 8 mm wide in horizontal distance from the peripheral edges of the substrate; and the vertical distance from the surface of the top layer to the peripheral edge of the substrate is about 5 to 50 mm.

It is preferred that the top solid layer mentioned above be firmly bonded to the block substrate with squeeze-out deposits of cured cement mortar around the top layer, whereby the bonding layer of cement mortar is substantially free of voids to increase bonding strength and to prevent the bonded interface from permeation of water.

There is also provided, according to the present invention, a method for producing a paving block comprising a block substrate and a tile-like top layer bonded to the upper surface of the block substrate, with lateral margins of about 1 to 8 mm wide in horizontal distance from the peripheral edges of the substrate and with vertical distance of about 5∼50 mm from the surface of the top layer to the peripheral edge of the substrate; which method comprises applying adhesive cement mortar between the back of the top layer and the upper surface of the substrate, placing the top layer on the substrate with the above-mentioned margins of the substrate surface, and applying vibration and/or pressurization between the top layer and the substrate to firmly bond them and form squeeze-out deposits of the adhesive cement mortar around the top layer.

BRIEF DESCRIPTION OF DRAWINGS

DETAILED DESCRIPTION OF THE PREFERRED EMBODIMENTS (1) Configurations, Dimensions, etc. of the Blocks FIG. 1 shows a perspective view of a paving block 1 composed of a block substrate 1—1 and a cement mortar top layer 1-2 according to the present invention. FIG. 2A shows a cross-sectional view of adjacently arranged two blocks of FIG. 1. FIG. 2B is a schematic cross-sectional view of the blocks of FIG. 2A which are inclined together when heavy weight is loaded from cars or the like. FIG. 3 shows a perspective view of the present paving block composed of a block substrate 1—1 and a tile-like top layer 1-2 bonded to the substrate with adhesive cement mortar, wherein squeeze-out deposits 6 of the cement mortar is observed around the top layer.

In FIGS. 1 and 2A, the configurations and dimensions of the block 1 are shown, wherein $l_1$ is a lateral length, $l_2$ is a side length and $l_3$ is a height of the block substrate. In general, the length of $l_1$ or $l_2$ is about 8 to about 50 cm. The height $l_3$ is at least about 3 cm and in the range of about 3-20 cm, generally at least about 4 cm and in the range of about 4~20 cm, preferably about 4~15 cm, and normally about 4~10 cm. The numeral 2 shows lateral margins on the surface of the block substrate 1—1, the width or horizontal distance $l_5$ from the peripheral edges being about 1~8 mm and normally about 1~5 mm. The lateral margin 2 can be substantially horizontal or can be inclined in a sloping or round fashion as shown in FIG. 4. The numeral 3 shows a vertical side of the top layer 1-2 and the 4 shows a preferred embodiment of beveling portions or round corners of the top layer, the horizontal distance $l_4$ of the beveling or round corners being substantially zero to a few millimeters. The numeral 5 shows a surface of the top layer 1-2, the vertical distance $l_6$ from the surface 5 of the top layer to the peripheral edge of the margin 2 of the substrate 1—1 being about 5~50 mm and normally about 5~30 mm. Incidentally as shown in FIG. 2A, the paving blocks are installed on the ground at an interval of about 2~5 mm, and thus the distance l between the adjacent top layers of the installed blocks is about 4 mm or more. The intervals and distances l are filled with sand, when the blocks are installed.

FIGS. 4A through 4D are partial side views of the paving blocks 1 showing the examples of configurations of the round corners (or beveling) 4 and margins 2 of the blocks. These configurations are also as effective as those shown in FIGS. 1 and 3.

FIG. 5 is a cross-sectional view of a paving block according to the present invention, showing a tile-like, solid top layer 1-2 is placed and bonded onto a dish-like depression 9 of a block substrate 1—1 with an adhesive cement mortar layer 7 between the top layer and the depression. The upper surface of the block substrate comprises peripheral margins 2, depression 9, and slopes 10 which connect the depression to the margins. The angle $\theta$ of the slope is generally about 30~60 degrees and typically about 45 degrees to the horizontal direction. Such slopes are useful to receive the top layer in the proper position of the depression. The slopes, however, are not essential, and the depression can be connected to the margins with vertical walls. The depression 9 has such a configuration as to receive the back of the tile-like top layer and the adhesive cement mortar. FIG. 6 shows a cross-sectional view of another paving block, wherein the depression 9 of the block substrate 1—1 has some spaces 11 at the slopes 10 for holding squeeze-out deposits 6 of the adhesive cement mortar. The depth of the depression 9 is generally in the range of about 1.5~10 mm and normally about 2~5 mm. Incidentally, the depression 9 can have some cut-outs at the corners or walls of the depression to readily drive out some excess adhesive cement mortar and to prevent the corners or walls from fracture.

FIG. 7 shows a cross-sectional view of a block substrate 1—1 similar to those shown in FIGS. 5 and 6, wherein the lower major portion of the substrate comprises cement concrete 12 containing comparatively coarse aggregate and the upper surface of the substrate is substantially covered with cured cement mortar 8 containing comparatively fine aggregate, whereby the shoulders including the margins 2 of the substrate is provided with good appearances and the tile-like top layer can be readily bonded to the substrate without interruption of the coarse aggregate. The cured cement mortar layer has a thickness of about 2~10 mm and normally about 3~4 mm. In FIG. 7, the cured mortar layer 8 provides the depression 9 and margins 2 of the block substrate. Such cured cement mortar layers, however, can also be employed in other block substrates as shown in FIGS. 1 and 3. (2) Materials for Producing the Blocks The term cement means an inorganic hydraulic material and represented by portland cement, alumina cement, fly ash cement, blast furnace cement, slag cement, and mixtures thereof. In general, portland cement is used. Conventional aggregate used for cement is also employed in the present invention, such as sand, slag and gravel. The cement material such as mortar and concrete can be colored as necessary.

Figure 1:
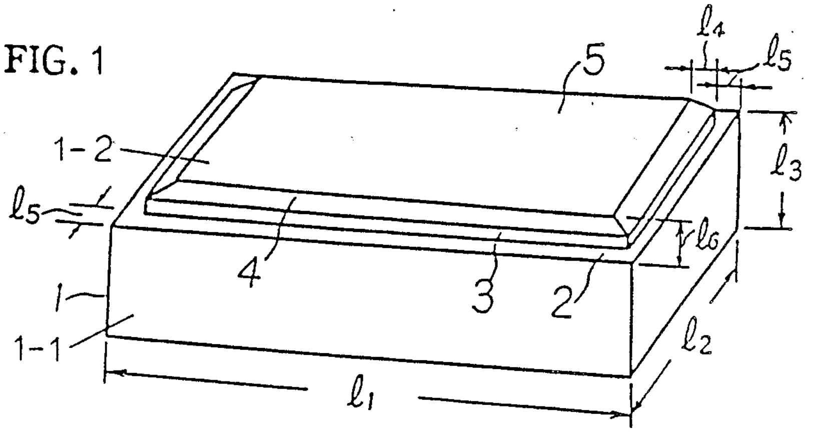
FIG. 1 is a perspective view showing a paving block of the present invention.
Figure 2A:
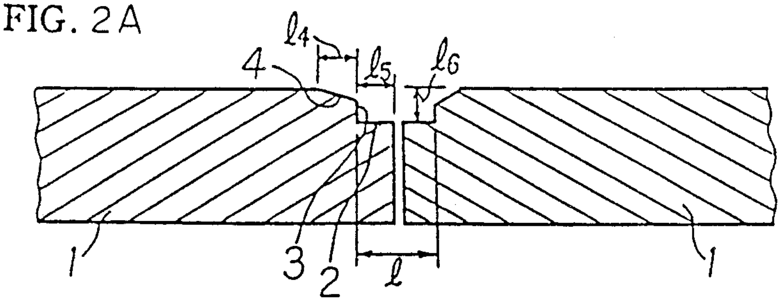
FIGS. 2A and 2B are cross-sectional views of the paving block of FIG. 1.
Figure 2B:
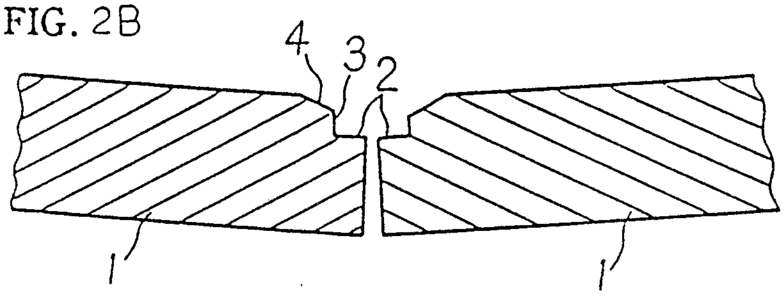
Figure 3:
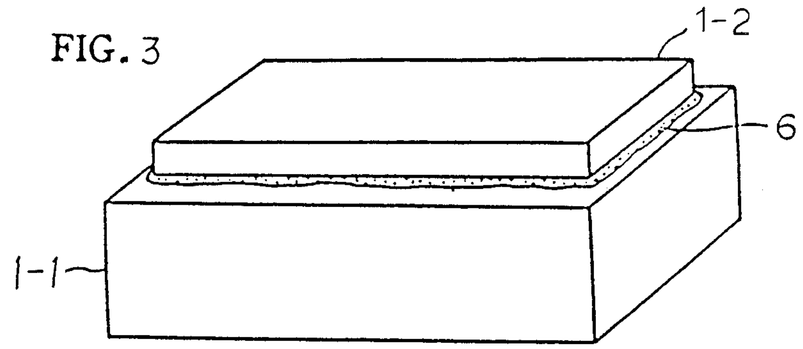
FIG. 3 is a perspective view showing a paving block of the present invention.
Figure 4A:
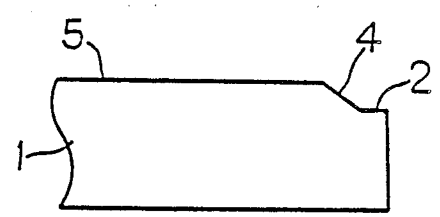
FIGS. 4A through 4D is a schematic partial side views showing configurations of the block.
Figure 4B:
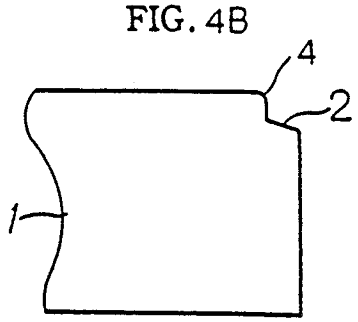
Figure 4C:
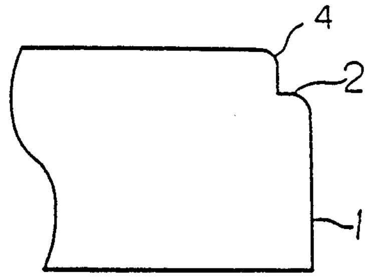
Figure 4D:
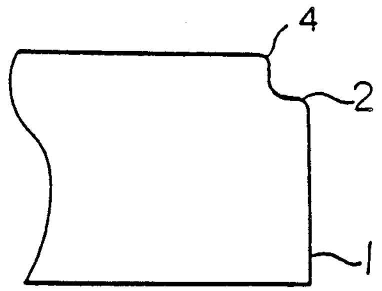
Figure 5:
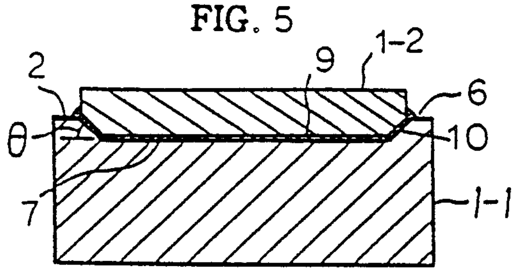
FIGS. 5 and 6 are cross-sectional views showing embodiments of the blocks.
Figure 6:
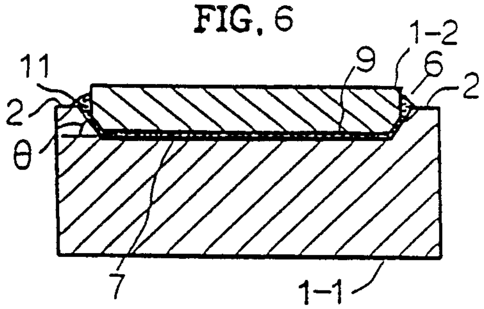

As to general sizes of aggregate, cement concrete for the block substrate may contain comparatively coarse aggregate, the sizes of which are those of remaining on 5 mm-square screen and normally those of remaining on 5 mm-square screen and passing through 20 mm-square screen. The sizes of aggregate for a cement mortar top layer 1-2 or a cured cement mortar 8 covering cement concrete substrate are those passing through 5 mm-square screen and preferably through 4 mm-square screen. The sizes of fine aggregate for the adhesive cement mortar 7 are those passing through 1.2 mm-square screen and preferably through 1 mm-square screen.

Incidentally, cement mortar containing such fine aggregate can be used as adhesive cement mortar. It is preferred that the adhesive cement mortar comprises a major amount of the cement mortar and a minor amount (e.g. about 40~5% by weight) of an organic adhesive polymer such as styrene butadiene rubber (SBR) latex or acrylic polymer emulsion.

The tile-like top layers 1-2 include, for example, ceramic tile produced from minerals, and similar sintered plates produced from inorganic substances; natural stone plates of granite, marble, slate, etc.; and artificial stone plates such as decorative cement boards and resin-modified cement boards. The tile-like layers, however, are not restricted to those shown above, as far as they have good bonding properties, sufficient strength and good appearances. (3) Steps for Bonding the Top Layer onto the Block Substrate When the block comprises a cured mortar top layer and a block substrate, the block can be successfully produced by casting concrete mortar for the substrate into a mold and then casting cement mortar thereon, followed by applying thereto an upper mold for the top layer and a densification step such as vibration.

Figure 8A:
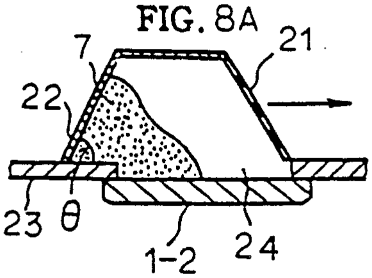
FIGS. 8A through 8E are cross-sectional views showing steps for producing the block.
Figure 8B:
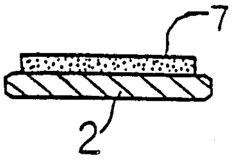

FIGS. 8A through 8E are cross-sectional views showing preferred embodiments or steps for bonding a tile-like top 1-2 layer onto a block substrate 1—1. FIG. 8A shows a mortar applicator moving sideways (cf. arrow) on a masking board 23 and over the masked tile-like top layer 1-2. The applicator 21 is equipped with a slant wall 22 angled at about 30~60 degrees shown by $\theta$ to the horizontal direction and arranged in the cross-machine direction, whereby adhesive cement mortar 7 is uniformly applied through the opening 23 of the masking board 24 by the moving slant wall onto the back of the top layer (cf. FIG. 8B). The adhesive mortar is applied in the thickness of about 2~5 mm. The applicator 21 can also be used to apply the mortar onto the upper surface of the block substrate 1-2 with or without the depression 9.

Figure 8C:
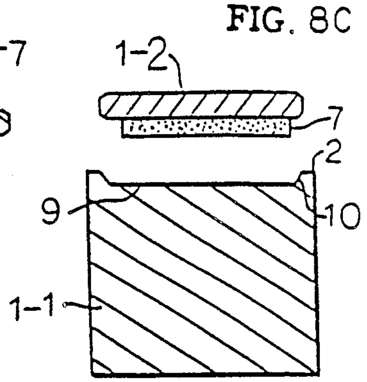
Figure 8D:
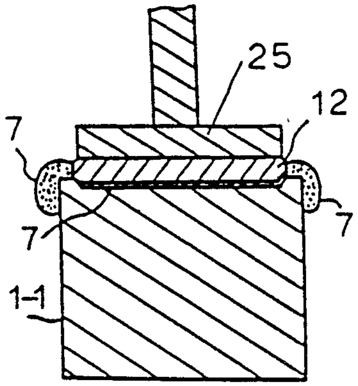
Figure 8E:
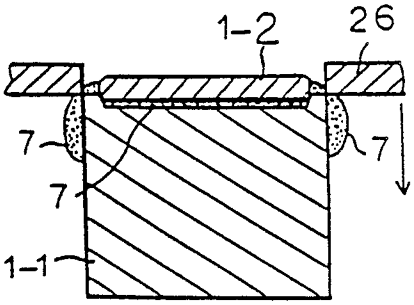
Figure 7:
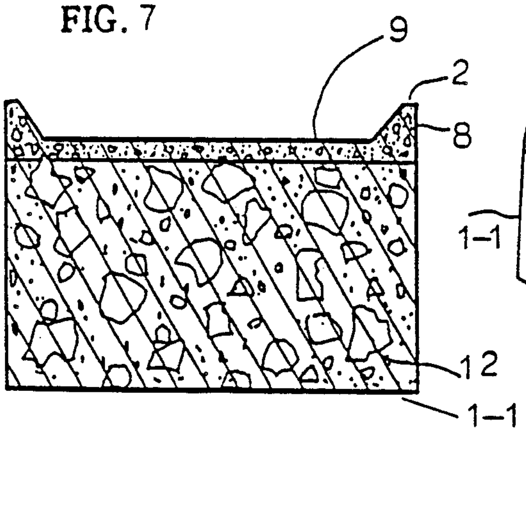
FIG. 7 is a cross-sectional view showing an embodiment of a substrate of the blocks.
Figure 9:
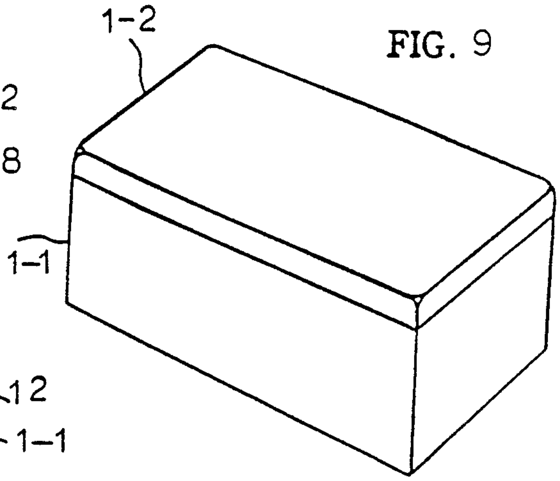
FIG. 9 is a perspective view of a conventional block.

The mortar-backed top layer (cf. FIG. 8B) is turned upside down and is placed on the upper surface of the substrate 1—1 (cf. FIG. 8C). Vibration (e.g. 1000 to 10,000 cycles/minute) and/or pressurization (e.g. 0.1 to 0.5 Kgf/square cm) and preferably the both actions are applied onto the top layer by means of a clamping plate 25 placed on the top layer, whereby the adhesive cement mortar is squeezed out and often flowed out onto the side surfaces of the substrate (cf. FIG. 8D). The excess mortar 7 remaining on the side surfaces is effectively scraped away by means of a frame 26 having a horizontally sectional shape of the block substrate 1—1 (cf. FIG. 8E). Incidentally, the frame 26 can be composed of a metal frame having inside edges of a resilient material.

(4) Experiments for Demonstrating Non-fracture or Fracture of Paving Blocks

The following paving blocks were produced for the experiments.

(A) Conventional block without peripheral margins
  (Dimensions: 98 mm×198 mm×80 mm in height)
(B) Conventional block without margins and with beveling
  (about 45 degrees, 2 mm in horizontal distance) at top edges thereof
  (Dimentions: 98 mm×198 mm×80 mm in height)
(C) Block having top layer with margins of 2 mm wide
  (top layer: 8 mm high from the margins)
  (block substrate: 98 mm×198 mm×80 mm in height)
(D) Block having top layer with beveling and margins of 2 mm wide
  (top layer; 8 mm high from the margin, with beveling about 45 degrees, 2 mm in horizontal distance)
  (block substrate; 98 mm×198 mm×80 mm in height)

Hundred (100) pieces each of the paving blocks (A), (B), (C) and (D) were installed on the ground in 10 lines and 10 rows, respectively. A mortar truck having gross weight of 7 metric tons was driven 600 times on the paving blocks thus installed. As a result, the blocks (D) according to the present invention showed no substantial fracture. The blocks (C) according to the present invention showed light fracture in 2 pieces out of 100 pieces of the blocks; such small fracture was evaluated to be practically satisfactory. The conventional blocks (A) showed serious fracture in 38 pieces out of 100 pieces. The conventional blocks (B) also showed serious fracture in 13 pieces out of 100 pieces of the blocks.

It has not been fully clarified why the present paving blocks having the peripheral margins 1∼8 mm wide (preferably 1∼5 mm) and the top layer 5∼50 mm in height (preferably 5∼30 mm) are substantially prevented from such serious fracture. The main reasons therefor, however, are considered due to the following actions:

(a) The present paving block is provided with the margins and top layer. Also, the block substrate is substantially covered with a rather thick top layer. Thus, the edges of the top layer are substantially prevented or moderated from collision, and the shoulders of the substrate are substantially protected with the covering top layer from fracture even when the shoulders of the adjacent substrates collide with each other.
(b) Because the top layer is bonded with the margins onto the block substrate, heavy weight on the top layer is loaded on the inner sides of the surfaces of the block substrate. Thus, the force of collision of the substrate shoulders is somewhat moderated.

Incidentally, when the width of margins is more than about 8 mm or the height of the top layer is less than about 5 mm, the protection of the substrate shoulders as mentioned above (a) will be less expected. When the height of the top layer is more than about 50 mm, uniform dispersion of the loads pressed on the top layer into the whole block body is worsened thus deteriorating the durability of blocks.

INDUSTRIAL APPLICABILITY

Fracture of paving blocks installed on the grounds are substantially eliminated according to the present paving blocks and method for production thereof. Thus, the blocks according to the present invention are especially useful for block pavement where heavy weight is loaded. Such paving blocks can be effectively produced according to the method of the present invention.

We claim:

1. A method for producing a paving block comprising a block substrate and a solid top layer selected from the group consisting of a tile layer and a cured cement mortar layer bonded to the upper surface of the block substrate having a thickness in the range of 3 cm to 20 cm, with lateral margins of 1 to 8 mm wide in horizontal distance from the peripheral edges of the substrate to the top layer and with vertical distance of 5 to 50 mm from the surface of the top layer to the peripheral edge of the substrate, said method comprising:

applying adhesive cement mortar between the back of the top layer and the upper surface of the substrate, placing the top layer on the substrate with the above-mentioned margins of the substrate surface, and applying vibration and/or pressurization between the top layer and the substrate to firmly bond them and form squeeze-out deposits of the adhesive cement mortar around the top layer.

2. The method according to claim 1, in which the adhesive cement mortar is applied onto the back of the top layer and the mortar-backed top layer is placed on the substrate.

3. The method according to claim 1, in which adhesive cement mortar flowed out onto the side surfaces of the substrate in the course of the vibration and/or pressurization step is scraped away by means of a frame having a horizontally sectional shape of the block substrate.

4. The method according to claim 1, in which the adhesive cement mortar comprises a major amount of cement mortar and a minor amount of an organic adhesive polymer.

5. The method according to claim 1, in which the adhesive cement mortar is uniformly applied through the opening of a masking board by moving sidewards a mortar applicator having a slant wall on the masking board.

6. The method according to claim 1, in which the block substrate comprises cement concrete containing coarse aggregate, and the upper surface of the block substrate is substantially covered with cured cement mortar containing fine aggregate.

7. The method according to claim 6, in which the coarse aggregate is of a size which remains on a 5 mm-square screen and the fine aggregate is of a size which passes through a 5 mm-square screen.

8. The method according to claim 6, in which the upper surface of the block substrate has a depression for receiving the back of the solid top layer and the adhesive cement mortar and the solid layer is bonded into the depression.

9. The method according to claim 7, in which the depression is connected with slopes to the peripheries of the block substrate.

10. The method according to claim 1, in which the upper surface of the block substrate has a depression for receiving the back of the solid top layer and the adhesive cement mortar and the solid layer is bonded into the depression.

11. The method according to claim 10, in which the depression is connected with slopes to the peripheries of the block substrate.

12. A method for producing a paving block comprising a concrete block substrate and a cured cement mortar top layer containing fine aggregate bonded to the upper surface of the block substrate having thickness in the range of 3 cm to 20 cm, with lateral margins of 1 to 8 mm wide in horizontal distance from the peripheral edges of the substrate to the top layer and with vertical distance of 5 to 50 mm from the surface of the top layer to the peripheral edge of the substrate, said method comprising:

casting concrete mortar for the substrate into a mold;

casting cement mortar for the top layer onto the cast concrete mortar;

applying an upper mold for the top layer onto the cast cement mortar and concrete mortar; and then subjecting the cast materials in the mold to a densification step.

13. The method according to claim 12, in which the lateral margins are 1 to 5 in width, and the vertical distance between the top layer surface and the peripheral edge is 5 to 30 mm.

14. The method according to claim 12, in which the cement mortar top layer is firmly bonded to the concrete block substrate with squeeze-out deposits of the cement mortar around the top layer, said squeeze-out deposits being formed by said densification whereby a bonded interface between the top layer and the block substrate is substantially free of voids to increase bonding strength and to prevent the bonded interface from permeation of water.

15. A method according to claim 12 wherein said densification step comprises vibration.

16. The method according to claim 12, in which the fine aggregate is of a size which passes through a 5 mm-square screen.

* * * * *

UNITED STATES PATENT AND TRADEMARK OFFICE
CERTIFICATE OF CORRECTION

PATENT NO. : 4,995,932
DATED : February 26, 1991
INVENTOR(S) : YOSHIDA et al.

It is certified that error appears in the above-identified patent and that said Letters Patent is hereby corrected as shown below:

Column 7, line 6 — Delete "according to claim 7", insert therefor, -- according to claim 8 --

Signed and Sealed this

Twenty-third Day of March, 1993

Attest:

STEPHEN G. KUNIN

*Attesting Officer* — *Acting Commissioner of Patents and Trademarks*